Sept. 25, 1962

TOSHIO SHIMIZU 3,055,979

INTERPHONE APPARATUS

Filed Oct. 2, 1958

Inventor
Toshio Shimizu
by Hill, Sherman, Meroni, Gross & Simpson Attys

United States Patent Office 3,055,979
Patented Sept. 25, 1962

3,055,979
INTERPHONE APPARATUS
Toshio Shimizu, 19, 1-chome, Ogikubo, Suginami-ku, Tokyo, Japan
Filed Oct. 2, 1958, Ser. No. 764,847
Claims priority, application Japan Oct. 16, 1957
9 Claims. (Cl. 179—1)

This invention relates to an interphone apparatus, and more particularly to such an apparatus having a transistor amplifier.

The principal object of this invention is to provide a transistor interphone apparatus in which no electric power is consumed from a battery source located only at the master station and while the master station, and the entire interphone system, is in its inactive or reset condition, and in which said master station can be called and signalled from a remote station while in its non-current consuming reset condition.

Another object of this invention is to provide a transistor interphone apparatus of this type in which a master station and at least one remote or substation are connected to each other by only two lines.

Other objects, features and advantages of this invention will be more apparent from the following detailed description taken in connection with the accompanying drawing in which.

Figure 1:
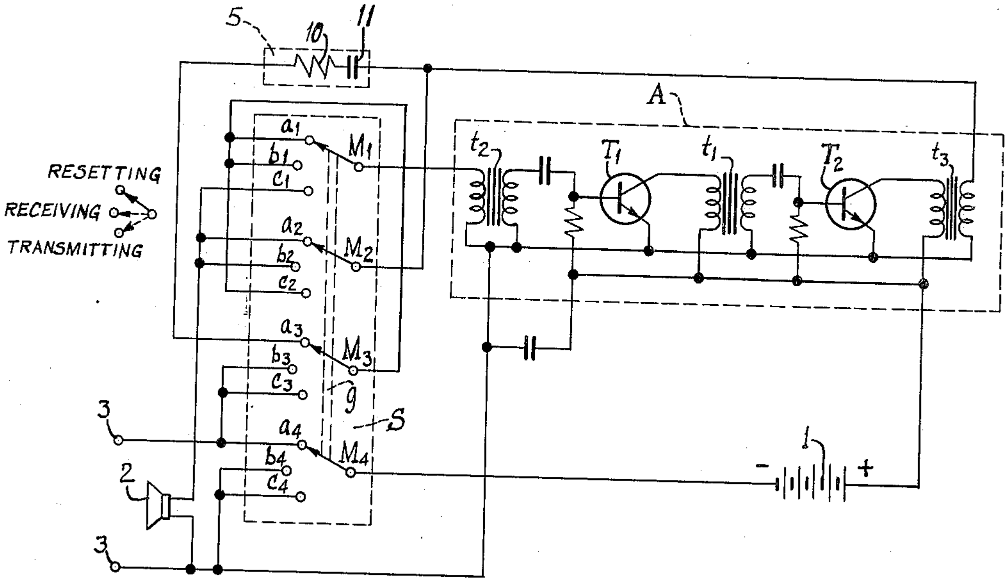
FIG. 1 is a connection diagram of a master station according to a first exemplary embodiment of this invention.

Referring to the drawing, $T_1$ and $T_2$ illustrate respectively transistors of the n-p-n type, for example, which forms a two-stage transistor amplifier as shown enclosed by the dotted line A in FIG. 1.

It will be understood that any desired number of stages of transistors may be used under this invention. However, in the present exemplary embodiment, two stages of transistors are coupled by a transformer $t_1$. $t_2$ is an input transformer the secondary side of which is connected to the transistor $T_1$, and $t_3$ is an output transformer, the primary side of which is connected to the transistor $T_2$. 1 designates a battery source, S a press-talk switch, and 2 a combined microphone and speaker. It is to be noted that the amplifier circuit A and the current source or battery 1 are both located at and as part of the master station in all forms of this inventoin and that only one such source and one such amplifier are needed for the entire interphone system.

In accordance with a first exemplary embodiment of this invention, the plus side of the battery 1 is always connected to electrodes such as the collectors of the transistors $T_1$ and $T_2$ through the primary sides of the transformers $t_1$ and $t_3$ but the minus side of the battery 1 is connected to one of lines 3, which are led to any one of the remote stations through a contact point $a_4$ of the press-talk switch S, the other of the lines 3 being connected to the emitter side of the transistor amplifier A. The lines 3 are led to a remote or sub station, which has a calling switch 4, and a combined microphone and speaker 6 connected in parallel with each other through a condenser 7, as shown in FIG. 2, which can be considered as a part of the first embodiment of FIG. 1.

Figures 2, 3, 4:
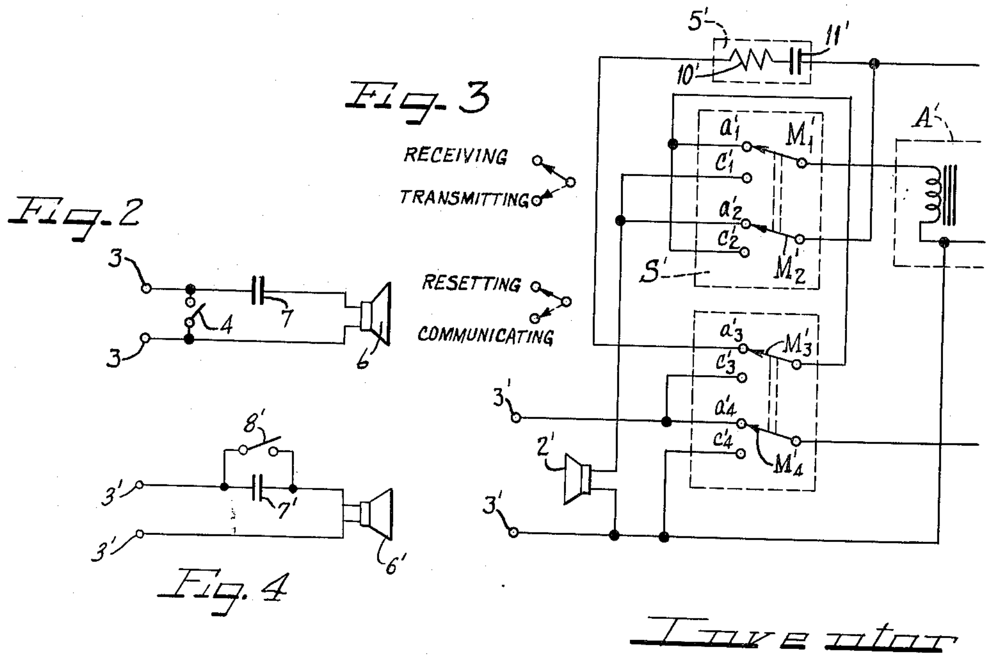
FIG. 2 is a connectoin diagram of a remote or substation according to a first exemplary embodiment of this invention.
FIG. 3 shows a connection diagram of another form of the master station according to a second exemplary embodiment of this invention.
FIGURE 4 is a connection diagram of a remote or sub-station according to a second exemplary embodiment of this invention.

By these connections the calling switch 4 of the remote or sub station of FIGURE 2 is connected, through the lines 3, the contact point $a_4$ and the battery source 1, to the input side of the transistor $T_1$.

Moreover, according to this invention, an oscillation producing the means or circuit portion 5 can be selectively switched in or thus inserted between the input side and the output side (or intermediate stage) of the transistor amplifier A. In the drawing, by way of example, a positive feed back element, which is composed of a series connection of a resistance 10 and capacitor 11, is inserted or switch connected between the input and output sides of the transistor amplifier.

The press-talk switch S has three stationary contact point groups, generally shown by *a*, *b* and *c*.

The stationary contact point group *a* consists of contact points $a_1$, $a_2$, $a_3$ and $a_4$ and the stationary contact point group *b* consists of contact points $b_1$, $b_2$, $b_3$ and $b_4$. Similarly, the stationary contact point group *c* consists of contact points $c_1$, $c_2$, $c_3$ and $c_4$. The press-talk switch also has four movable contacts $M_1$, $M_2$, $M_3$ and $M_4$, which respectively cooperate with the stationary point contact groups $a_1$, $b_1$, $c_1$, $a_2$, $b_2$, $c_2$, $a_3$, $b_3$, $c_3$, and $a_4$, $b_4$, $c_4$. The movable contacts $M_1$ to $M_4$, inclusive, are so ganged with a press bar 9, that they contact or connect respectively and at the same time, to the stationary contact groups *a*, *b* and *c*. The movable contacts $M_1$ to $M_4$ the stationary contact point groups *a*, *b* and *c* in three positions, that is, the reset position the receiving position and the sending position.

In the reset setting, the minus pole of the battery 1 is connected, through the stationary contact point $a_4$, to the remote station, but the line is opened at the remote station when as the calling switch 4 is open or inoperative.

In order to call the master station, from the remote station with the master station in the reset condition as shown in FIG. 1, the switch 4 is closed, so that the minus pole of the battery 1 is connected to the emitter sides of the transistors $T_1$, $T_2$ through the lines 3 contact point $a_4$, and the switch 4. The transistor amplifier A is then operated as an oscillator since the oscillation circuit 5 is the transistor circuit in the reset condition.

The oscillation sounds are heard from the speaker 2, which gives the call signal at the master station from the remote station. At this time, the person at the master station actuates the press-talk switch S to change the movable contacts $M_1$ to $M_4$, inclusive, over the stationary contact groups *b* and *c*. Thus, complete or two way calling and communication between the master and remote or sub stations is provided.

In order to call the remote station from the master station, the press-talk switch S is turned to the sending position, or to the stationary contact group *c* from *a*. Then the minus pole of the battery 1 is connected, through contact point $c_4$, to transistors $T_1$ and $T_2$ and at the same time the microphone 2 is connected across both terminals of the primary side of the transformer when the oscillation producing circuit portion 5 is opened by cutting out the stationary contact group *a* so that the calling current from the microphone 2 is transmitted to the speaker 6, which calls the remote or sub station.

FIG. 3 shows another and second exemplary embodiment of this invention in which similar reference characters plus a prime are used for like parts and in which stationary contact groups like $b_1$, $b_2$ and $b_3$, of the master station as shown in FIG. 1, are omitted for the sake of simplicity.

That is, the press-talk switch S has receiving-transmitting stationary contact groups $a_1'$, $c_1'$, and $a_2'$, $c_2'$ which respectively cooperate with movable contacts $M_1'$ and $M_2'$, ganged with each other and with source switch, stationary contact groups $a_3'$, $c_3'$ and $a_4'$, $c_4'$ which in turn cooperate respectively with movable contacts $M_3'$ and $M_4'$ which last are ganged together. In this example, the calling operation is the same as that described above. In communication, the stationary contact groups $a_1'-c_1'$, and $a_2'-c_2'$ are respectively changed over or switched by the usual operation of the press-talk switch after the movable contacts $M_3'$ and $M_4'$ of the source switch have been switched or connected to the contact points $c_3'$ and $c_4'$ from contact points $a_3'$ and $a_4'$. The other connections and the operation of this form of the apparatus are the same as that of the form shown in FIG. 1. In cases where the current flowing through the lines and the substation microphone-speaker unit (such as 6' or 6), is small, the condenser shunting switch 8' can be used as the calling switch in the substation as shown in FIGURE 4, which figure may be considered as part of the second embodiment of FIGURE 3. This calling switch 8' may thus be used in this case in lieu of the calling switch 4 of FIGURE 2.

While I have explained only particular more specific embodiments of my invention, it will be understood, of course, that I do not wish to be limited thereto since many modifications may be made therein and I, therefore, intend by the appended claims to cover any such modifications as fall within the spirit and scope of my invention.

What is claimed is:

1. An interphone system comprising at least one remote substation and an operatively connected master station,
said master station comprising first means for amplified voice transmitting, for amplified voice receiving and for calling signalling,
said first means also including a combined microphone speaker unit,
a multiposition switch means of the press talk type operatively connected to the parts of said first means including its microphone and speaker unit,
a common system electric source operatively connected to said switch means,
a common system voice amplifier circuit of the transistor type connected to said switch means to be switchably convertible to a calling signal oscillator and an oscillation producing circuit portion connected to said switch means and to be switchably connectable across said common voice amplifier circuit to convert it to a calling signal oscillator,
said substation comprising second means for voice transmission or reception connected to said switch means to be amplified by said common amplifier circuit of said master station, to be powered by said common electric source and to supply a calling signal to said master station by said converted calling signal oscillator,
said second means also including a combined microphone and speaker unit for said substation and
a calling switch operatively connected to said substation microphone and speaker unit and to said switch means to selectively connect said oscillation producing circuit portion across said voice amplifier circuit of said master station to convert it into a calling signal oscillator to call said master station from said substation.

2. An interphone system comprising at least one remote substation and an operatively connected master station,
said master station comprising first means for amplified voice transmitting, for amplified voice receiving and for calling signalling,
said first means also including a combined microphone and speaker unit,
a multiposition switch means of the press talk type operatively connected to the parts of said first means including its microphone and speaker unit, a common, system electric source operatively connected to said switch means,
a common, system voice amplifier circuit of the transistor type connected to said switch means to be switchably convertible to a calling signal oscillator and an oscillation producing circuit portion connected to said switch means and to be switchably connectable across said common voice amplifier circuit to convert it to a calling signal oscillator,
said substation comprising second means for voice transmission or reception connected to said switch means to be amplified by said common amplifier circuit of said master station, to be powered by said common electric source and to supply a calling signal to said master station by said converted calling signal oscillator,
said second means also including a combined microphone and speaker unit for said substation and
a calling switch operatively connected to said substation microphone and speaker unit and to said switch means to selectively connect said oscillation producing circuit portion across said voice amplifier circuit of said master station to convert it into a calling signal oscillator to call said master station from said substation,
said switch means including four ganged together switch units each having three positions, one for reset, one for receiving and one for transmitting, said oscillation producing circuit portion being connected through said calling switch across said amplifier circuit by the reset position of said switch means,
said combined microphone and speaker unit of said master station being operatively connected across the input side of said amplifier circuit by the transmitting position of said switch means and
said combined microphone and speaker unit of said master station being operatively connected across the output side of said amplifier circuit by the receiving position of said switch means.

3. An interphone system comprising at least one remote substation and an operatively connected master station,
said master station comprising first means for amplified voice transmitting for amplified voice receiving and for calling signalling,
said first means also including a combined microphone and speaker unit
a multiposition switch means of the press talk type operatively connected to the parts of said first means including its microphone and speaker unit,
a common, system electric source connected to said switch means,
a common, system voice amplifier circuit of the transistor type connected to said switch means to be switchably convertible to a calling signal oscillator and
an oscillation producing circuit portion connected to said switch means to be switchably connectable across said common voice amplifier circuit to convert it to a calling signal oscillator,
said multiposition switch means including a set of two ganged together switch units each having two selectable positions for receiving or transmitting to selectively connect said combined microphone and speaker unit of said master station across the output side or the input side respectively of said common amplifier circuit and
an independently movable set of two ganged together switch units each having two selectable positions for reset or communicating to selectively and respectively convert said amplifier circuit into a calling signal oscillator or to operatively connect said amplifier circuit for communication,
said substation comprising second means for voice transmission or reception connected to said switch means to be amplified by said common amplifier circuit of said master station, to be powered by said common electric source and to supply a calling signal to said master station by said converting calling signal oscillator, second means also including a combined microphone and speaker unit for said substation and a calling switch operatively connected to said substation microphone and speaker unit and to said switch means to selectively connect said oscillation producing circuit portion across said voice amplifier circuit of said master station to convert it into a calling signal oscillator to call said master station from said substation.

4. An interphone system comprising a master station and at least one substation connected thereto and from which said master station can be signalled, said master station including first means for transmitting, for receiving and for generating calling signal and including a voice amplifier circuit means common to said system, switch means connected to the parts of said first means and means connectable to convert said amplifier circuit means to a calling signal oscillator, said substation including second means for transmitting and receiving and including a calling switch connected to said first means to operatively connect said means to convert said amplifier means to a calling signal oscillator to thus signal said master station.

5. A two-way calling and receiving transmitting, two wire type interphone system comprising a master station and at least one remote substation connected thereto by only two wires and from which said master station can be singalled and which can be signalled from said master station for voice transmission or reception from either one to the other, said master station including first means for transmitting and receiving, said first means including switch means operatively connected to the parts of said first means, means for electric power supply for said system connected to said switch means and a common system voice amplifier connected to said switch means and switchably convertible to a calling signal generating oscillator, said substation including second means for voice or signal reception and for voice transmission connected to said switch means for substation voice amplification by said common amplifier and means including a calling switch at said substation connected to said first means to selectively convert said amplifier to a calling signal generator.

6. A battery operated and low current using interphone system comprising a master station and at least one wire connected substation and in which calling signals may be initiated at all stations thereof for two-way communication powered entirely from said master station, each said substation comprising first means for voice transmitting and for reception of voice or calling signal, each said first means also including a combined microphone-speaker unit and a calling switch operatively connected thereto, said master station comprising second means for voice transmission and for voice or signal reception, for supplying power and for amplifying and generating calling signals for said system, said second means also including a combined microphone-speaker unit, a common system battery electric supply, multiposition switching means operatively connected to the parts of said second means and to said first means for at least selecting between signalling, receiving and transmitting and a common voice amplifier connected to said switch means and including a plurality of stages of transistors, said common amplifier being operatively connected to be convertible to a system calling signal generator by said calling switch.

7. A battery operated and low current using interphone system comprising a master station and at least one, wire connected substation and in which calling signals may be initiated at all stations thereof for two-way communication powered entirely from said master station, each said substation comprising first means for voice transmitting and for reception of voice or calling signal, each said first means also including a combined microphone-speaker unit, a calling switch operatively connected in series with one side of said substation microphone-speaker unit and a capacitance connected across said substation microphone-speaker unit, said master station comprising second means for voice transmission and for voice or signal reception, for supplying power and for amplifying and generating calling signals for said systems, said second means also including a combined microphone-speaker unit, a common system battery electric supply, multiposition switching means operatively connected to the parts of said second means and to said first means for at least selecting between signalling, receiving and transmitting and a common system voice amplifier connected to said switch means and including a plurality of stages of transistors, said common amplifier being connected to be switchably convertible to a system calling signal generating oscillator by said calling switch.

8. A battery operated and low current using interphone system comprising a master station and at least one, wire connected substation and in which calling signals may be initiated at all stations thereof for two-way communication powered entirely from said mast station, each said substation comprising first means for voice transmitting and for reception of voice or calling signal, each said first means including a combined microphone-speaker unit having a capacitance connected in series therewith and a calling switch connected across said capacitance, said master station comprising second means for voice transmission and voice or signal reception, for supplying power and for amplifying and generating calling signals for said system, said second means also including a combined microphone-speaker unit, a common system battery electric supply, multiposition switching means operatively connected to the parts of said second means and to said first means for at least selecting between signalling, receiving and transmitting and a common voice amplifier connected to said switch means and including a plurality of stages of transistors, said common amplifier being connected to be switchably convertible to a system calling signal generating oscillator by said calling switch.

9. A battery powered telephone system in which substantially no current flows except during signalling, transmission or receiving for low current consumption and in which any station can signal as well as receive or transmit relative to any other station, said system comprising, a master station including battery means for supplying current to the entire system,
voice transmission and reception means,
calling signal generating, transmitting and receiving means,
multiposition switch means operatively connected to the parts of said master station and having a plurality of selectable switching conditions including
one for call signalling said substation,
one for voice receiving,
one for voice transmitting and
one in which a calling signal from said substation can be received but in which substantially no current is used,
a voice amplifier common to the entire system and switchably convertible to a calling signal generating oscillator common to the entire system,
said voice amplifier being operatively connected to said multiposition switch means and at least one substation including means for receiving a signal from said master station, for initiating a signal to said master station and for voice reception and transmission,
said substation also including a calling switch operatively connected to have one position to switchably convert said amplifier to the common system calling signalling oscillator and to have another position for signal or voice reception or transmission.

References Cited in the file of this patent

UNITED STATES PATENTS

| | | |
|---|---|---|
| 2,567,484 | Ivens | Sept. 11, 1954 |
| 2,760,000 | Beukema et al. | Aug. 21, 1956 |
| 2,802,900 | Baker | Aug. 13, 1957 |
| 2,838,609 | Eklov | June 10, 1958 |
| 2,841,647 | Blow | July 1, 1958 |
| 2,881,250 | Blow et al. | Aug. 7, 1959 |